Jan. 18, 1949.  H. B. L. NEWMAN  2,459,389
PIPE COUPLING
Filed April 12, 1947
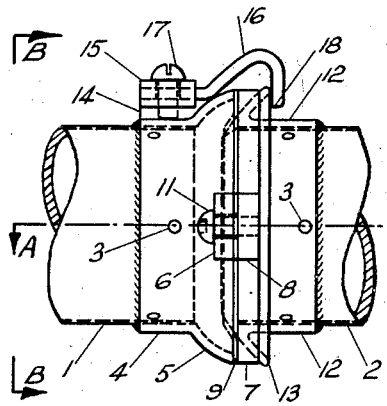
FIG. 1
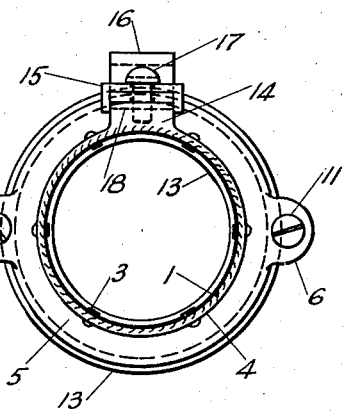
FIG. 2
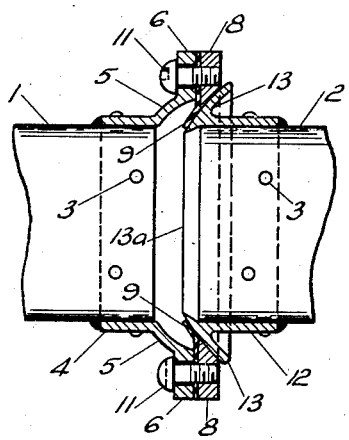
FIG. 3
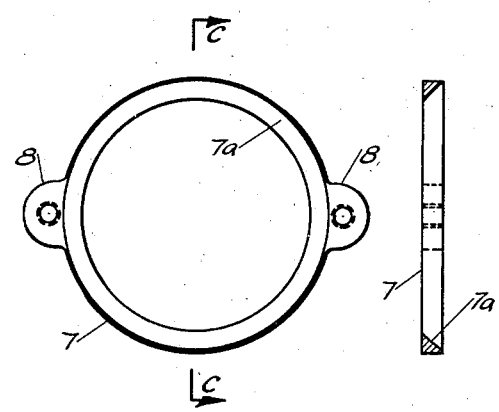
FIG. 4   FIG. 5
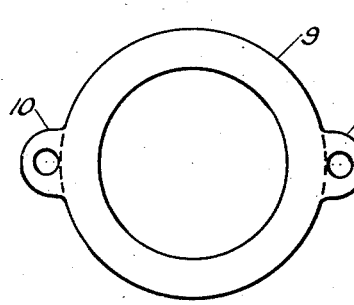
FIG. 6
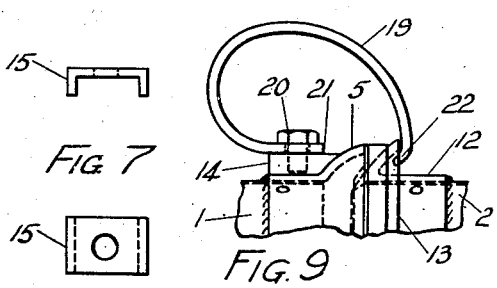
FIG. 7
FIG. 8
FIG. 9
INVENTOR:
HENRY BOWFORD LESLIE NEWMAN
BY DesJardins & Compton
HIS ATTORNEYS Patented Jan. 18, 1949

2,459,389

UNITED STATES PATENT OFFICE 2,459,389

PIPE COUPLING

Henry Bowford Leslie Newman, Rockhampton, Queensland, Australia

Application April 12, 1947, Serial No. 741,045
In Australia October 11, 1946

3 Claims. (Cl. 285—91)

The object of this invention is to provide an improved pipe coupling which will enable lengths of piping to be quickly coupled together, and which will enable a certain amount of angularity between the abutting pipe ends.

The invention is particularly adapted for coupling lengths of piping used in the irrigation of farms and the like where the pressure is not of a high order and provision has to be made for the quick location of the nipples so that time will not be required in making adjustments of the pipe lengths after the joints have been made.

The nature of the invention will be fully understood from the following description taken in connection with the accompanying drawings wherein:

Figure 1 is a side elevation of two pipe ends with the invention applied thereto in coupled attitude;

Figure 2 is an end elevation on the line B—B of Figure 1;

Figure 3 is a section on the line A—A of Figure 1;

Figure 4 is an elevation of the rigid retaining ring;

Figure 5 is a section on the line C—C of Figure 4;

Figure 6 is an elevation of the flexible rubber ring;

Figures 7 and 8 are end elevation and plan of the spring clamp; and

Figure 9 is a part side elevation of the invention with a modified spring clip.

In the drawings like reference numerals denote the same parts in the different figures, and referring to Figures 1, 2 and 3, two adjacent ends of pipes 1 and 2 are shown. One pipe end 1 has secured around it, by rivets 3 and soldering, a ring 4 provided with a co-axial integral socket 5. Lugs 6 are integral with the rim of said socket 5. A rigid retainer ring 7 with a concave seating 7a (see Figures 4 and 5) has lugs 8 matching with lugs 6 on socket 5, and a flexible rubber ring 9 (see Figure 6) with or without lugs 10 is secured between the rim of socket 5 and rigid retainer ring 7 by set screws 11 passed through holes in lugs 6 and screwed into threaded holes in lugs 8. This assembly forms the female section of the coupling.

The male section consists of a ring 12 secured to a pipe end 2 by rivets 3 and soldering. Ring 12 has integral with it a convex spigot flange 13 adapted to mate with the concave seating 7a of ring 7 and to have its end 13a projecting a short distance into socket 5 (see Figure 3). A boss 14 on ring 4 has a tapped hole. A spring clamp 15 (see Figures 7 and 8) of somewhat D-shape lies upon the inner end of a spring clip 16 with its legs on opposite sides thereof and of said boss 14. A set screw 17 passes through holes in said spring clamp 15, spring clip 16 and screws into the tapped hole in the boss 14. Spring clip 16 is somewhat U-shaped and its free end 18 is adapted to lie behind spigot flange 13 (see Figure 1) when the coupling is made.

Referring to Figure 9, 19 is a modified spring clip of somewhat elliptical shape and is of the same width as clip 16 (see Figure 2). A hexagon-headed set screw 20 passes through a hole in one end 21 of said clip 19 and screws into a tapped hole in boss 14. The other end 22 of said clip 19 is hooked to lie inside the rear of convex spigot flange 13.

In use the series of pipe lengths is laid with the female or socket ends towards the water supply. The joints are then made by raising the male or spigot end of the pipe so that the end 18 of clip 16 will take its place behind the convex spigot flange 13 with the spigot and socket joint loosely made. The whole length of piping is thus connected, and as the combined pipe length is resting on the spigot flanges 13, at the bottom, there is considerable pressure exerted against the spring clips 16 at the top thus tending to bring the joints tightly together. The rubber rings 9 are not cramped between the convex spigot flange 13 and socket 5 (see Figure 3) but remain in a free flexible condition upon the projecting end 13a of the convex spigot flange 13. When the water is forced through the coupled length of piping the pressure causes the said rubber rings 9 to make a final seating against convex spigot flanges 13. It will be understood that the disposition of the male and female sections may be reversed in laying a length of piping without affecting the efficiency of the joints or the flow of water.

Although a separate ring 7 is preferable and has been illustrated and described, the seating 7a may be in the socket 5 with the flexible ring 9 attached to the wall of said socket 5. The essence of the invention is in the provision of a flexible ring, such as a rubber ring 9, attached at its outer periphery to the socket 5 with its inner periphery free to be forced by the water pressure against the protruding end of the spigot flange 13 to prevent leakage, at the seating 7a, owing to the non-rigidity of the joint and the quick assembly thereof. When the nipples upon pipes 1 and 2 are to be aligned, usually at the top of the pipe line, pairs of guides may be provided upon each flange 13 between which the ends 18 of spring clips 16 are located during the assembly of the pipe line.

I claim:

1. An improved pipe coupling consisting of a socket for attachment to an end of a pipe, said socket having, at its rim, a rigid ring provided with a concave seating; and a spigot for attachment to the abutting end of an adjacent pipe, said spigot having a convex flange adapted to seat in the said ring; a flexible ring extending from said socket to the said convex flange; and a spring clip attached to said socket, the hook of said clip adapted to lie behind the flange on said spigot when the coupling is assembled.

2. An improved pipe coupling as claimed in claim 1 wherein the said rigid ring is separate from said socket and is secured thereto by set screws or the like with the outer periphery of said flexible ring gripped between said socket rim and said rigid ring.

3. In a pipe coupling having a socket and a spigot for attachment respectively to adjacent ends of pipes, a convex flange on said spigot lying upon and projecting beyond a concave seating in a rigid ring affixed to the rim of said socket, a flexible ring secured at its outer periphery between said rigid ring and the rim of said socket, the inner periphery of said flexible ring lying upon the projecting end of said spigot, and means for maintaining said spigot in contact with said rigid ring.

HENRY BOWFORD LESLIE NEWMAN.

REFERENCES CITED

The following references are of record in the file of this patent:

UNITED STATES PATENTS

| Number | Name | Date |
| --- | --- | --- |
| 1,938,035 | Mann | Dec. 5, 1933 |